United States Patent

Hama

[11] Patent Number: 5,933,938
[45] Date of Patent: Aug. 10, 1999

[54] BAND CLAMPING MACHINE

[75] Inventor: Taira Hama, Chino, Japan

[73] Assignee: Kabushiki Kaisha Mihama Seisakusho, Nagano-ken, Japan

[21] Appl. No.: 08/808,780

[22] Filed: Mar. 4, 1997

[30] Foreign Application Priority Data

Mar. 22, 1996 [JP] Japan .................................... 8-066386

[51] Int. Cl.[6] .............................................. B21D 39/00
[52] U.S. Cl. ................................ 29/515; 29/505; 29/524; 29/237; 29/243.5; 29/282; 72/403
[58] Field of Search ............................ 29/235, 237, 282, 29/252, 515, 243.56, 243.57, 283.5, 243.5, 343.58, 505, 509, 524; 72/403

[56] References Cited

U.S. PATENT DOCUMENTS

| | | | |
|---|---|---|---|
| 224,586 | 2/1880 | Earle | 29/237 |
| 1,848,867 | 3/1932 | Callaway | 29/88.2 |
| 1,927,688 | 9/1933 | McKee | 29/88.2 |
| 2,348,957 | 5/1944 | Carvalho | 72/313 |
| 2,382,359 | 8/1945 | Weightman | 78/15 |
| 2,696,745 | 12/1954 | Cooper | 81/9.3 |
| 2,954,813 | 10/1960 | Donaldson | 29/243.57 |
| 3,172,384 | 3/1965 | Tipton | 269/228 |
| 3,213,529 | 10/1965 | Gill | 29/237 |
| 3,364,555 | 1/1968 | Swink | 29/237 |
| 3,368,270 | 2/1968 | Babian | 29/237 |
| 3,583,056 | 6/1971 | Klenz | 29/243.57 |
| 4,003,238 | 1/1977 | Oetiker | 29/280 |
| 4,100,716 | 7/1978 | Barroso | 29/243.56 |
| 4,173,815 | 11/1979 | Lux et al. | 29/243.5 |
| 4,339,940 | 7/1982 | Mackay et al. | 29/243.56 |
| 4,884,432 | 12/1989 | Watson | 29/243.5 |
| 4,982,484 | 1/1991 | Liechty | 29/243.56 |
| 5,044,814 | 9/1991 | Hama | 403/290 |
| 5,249,346 | 10/1993 | Kohler | 29/243.56 |
| 5,269,054 | 12/1993 | Poteat et al. | 29/243.56 |
| 5,313,986 | 5/1994 | Jude | 29/237 |
| 5,339,505 | 8/1994 | Hama et al. | |
| 5,687,457 | 11/1997 | Hama | 24/20 CW |

FOREIGN PATENT DOCUMENTS

| | | | |
|---|---|---|---|
| 2450671 | 11/1980 | France | 29/237 |
| 50-14702 | 5/1975 | Japan . | |
| 1-205941 | 8/1989 | Japan | 29/243.56 |
| 2-292505 | 12/1990 | Japan . | |
| 1054007 | 11/1983 | U.S.S.R. | 29/235 |
| 1127737 | 12/1984 | U.S.S.R. | 29/235 |

*Primary Examiner*—Irene Cuda
*Assistant Examiner*—Nguyen T. Trinh
*Attorney, Agent, or Firm*—Jordan and Hamburg LLP

[57] ABSTRACT

A band clamping machine is provided for clamping a metallic clamping band having a band section, a lever for reducing an inner diameter of the looped band section, and a pair of fixing pieces for holding the lever. The band clamping machine includes a diameter reduction mechanism having a clamping arm for turning down the lever and an arm driving mechanism moving the clamping arm so as to turn down the lever. The arm driving mechanism includes a first mechanism for moving the clamping arm from an initial position to a mid position, and a second mechanism for moving the clamping arm from the mid position to a final position. A fixing mechanism is provided to bend the fixing pieces inward to fix the lever at the final position between the fixing pieces.

17 Claims, 11 Drawing Sheets

BAND CLAMPING MACHINE

BACKGROUND OF THE INVENTION

The present invention relates to a band clamping machine, which is capable of clamping a clamping band for clamping a member to be clamped, e.g., a joint boot of a vehicle.

To clamp joint boots of vehicles, metallic clamping bands are used. The metallic clamping bands were disclosed in Japanese Patent Publication Gazette No. 50-14702, etc.

Said conventional metallic band is shown in FIG. 15. In FIG. 15, the metallic clamping band 101 has a looped band section 102 and a lever 104, which is fixed at an overlapped section 103 of the band section 102 by spot welding. When an inner diameter of the looped band section 102 is reduced by the lever action of the lever 104, an end section 104a of the lever 104 is fixed by fixing pieces 105.

To clamp a hose, etc. to a pipe by the metallic band 101, a hose is first inserted through the looped metallic band 101 and inserted on the pipe, then the metallic band 101 is moved to a desired position for clamping the hose. Next, external force is applied to the end section 104a of the lever 104 as a power point of the lever; the lever 104 is turned about an end face 106 acting as a fulcrum of the lever 104, which contacts the band section 102, in the direction of an arrow TL1. By this action, the overlapped section 103 is turned down together with the lever 104, so that the inner diameter of the looped metallic band 101 is reduced, and the metallic band 101 clamps the hose on the pipe.

The end section 104a of the lever 104, which acts to clamp the hose, is fixed on an outer circumferential face of the looped band section 102 by the fixing pieces 105. By the fixing pieces 105, the clamping by the metallic band 101 is maintained.

Another type of the clamping band was disclosed in Japanese Patent Kokai Gazette No. 2-292505. In FIG. 16B, a band section 107 has an engaging hole 107a in one end section and a lever 108 is fixed on the other end section of the band section 107 by spot welding. The engaging hole 107a is an opening section of a boss which is embossed in the one end section of the band section 107.

As shown in FIG. 16A, the band section 107 is formed into a loop by engaging an end 108a of the lever 108, which will act as a fulcrum point, with the engaging hole 107a. If the lever 108 is turned about the fulcrum point 108a, in the direction of an arrow TL2, a part of the band section 107 is turned together with the lever 108, so that inner diameter of the looped metallic band 110 is reduced and a member to be clamped is clamped. The end section 108b of the lever 108 is fixed on an outer circumferential face of the looped band section 107 by fixing pieces 109. By the fixing pieces 109, clamping by the metallic band 110 is maintained.

However, in the above described clamping bands 101 and 110, the levers 104 and 108 are manually turned so as to reduce the inner diameter of the band sections 102 and 107. The ends of the levers 104 and 108 are pressed by the operator's hand so as to keep the diameter reduction states of the band sections 102 and 107 the fixing pieces 105 and 109 are bent by a hammer which is held in operator's the other hand. By manually bending the fixing pieces 105 and 109, the clamping force of the metallic bands 101 and 110 are not fixed. Further, it is dangerous for operators to manually hold the levers 104 and 108 and manually bend the fixing pieces 105 and 109 with the hammer. And working efficiency cannot be raised.

SUMMARY OF THE INVENTION

An object of the present invention is to provide a clamping machine which is capable of securely, automatically and efficiently clamping a metallic clamping band.

To achieve the object, the band clamping machine of the present invention for clamping a metallic band having: a band section capable of being formed into a loop so as to clamp a member to be clamped; a lever provided to one end of the band section, the lever being capable of reducing inner diameter of the looped band section when the lever is turned down on an outer circumferential face of the looped band section; and a pair of fixing pieces for holding the lever, which has been turned down on the looped band section, each of the fixing pieces being radially extended from each longitudinal edge of the band section, comprises:

a diameter reduction mechanism having a clamping arm for holding and turning down the lever of the metallic band so as to reduce the inner diameter of the looped band section;

an arm driving mechanism moving the clamping arm so as to turn down the lever until reaching a position between the fixing pieces, the arm driving mechanism including: a first mechanism for moving the clamping arm from an initial position, at which the clamping arm holds the lever, to a mid position, at which the lever is primarily turned down; and a second mechanism for moving the clamping arm from the mid position to a final position, at which the lever is completely turned down and located at the position between the fixing pieces; and a fixing mechanism for bending the fixing pieces inward so as to fix the lever at the position between the fixing pieces.

In the clamping machine, the diameter reduction mechanism may have a moving body to which the clamping arm is pivotably attached, wherein the first mechanism moves the moving body so as to move the clamping arm from the initial position to the mid position, and wherein the second mechanism makes the clamping arm pivot until reaching the final position.

In the clamping machine, the diameter reduction mechanism may have a holding member for holding the metallic band, wherein the holding member is provided to the moving body.

In the clamping machine, the fixing mechanism may have a lever presser for holding the lever to keep at the position between the fixing pieces.

The clamping machine may further comprise a base section, which has a holding mechanism for pinching both sides of the looped metallic band, and the fixing mechanism having a positioning mechanism for radially pressing the looped metallic band, wherein the positioning mechanism contacts and pushes the fixing pieces of the metallic band, which has been held by the holding mechanism, until the fixing pieces reach an uppermost position, whereby the metallic band is axially and circumferentially positioned at a prescribed position.

In the case of clamping a plurality of the clamping bands, a plurality of holding mechanisms for respectively pinching both sides of the looped metallic bands so as to simultaneously clamp a plurality of the metallic bands, which have been axially arranged on the member to be clamped may be provided in the band clamping machine, wherein the diameter reduction mechanism and the fixing mechanism are provided to each of the holding mechanisms.

Further, the present invention provides a method of clamping a metallic band comprising the steps of:

holding a shaft, on which a member to be clamped is attached, on a base section by pinching both sides of the looped metallic band, which has been attached on the member to be clamped;

pushing fixing pieces of the metallic band, each of which is radially extended from each longitudinal edge of the metallic band, until the fixing pieces reach an uppermost position;

partially turning a lever of the metallic band;

completely turning the lever until reaching a position between the fixing pieces so as to reduce inner diameter of the looped metallic band;

inwardly bending the fixing pieces so as to fix the lever on an outer circumferential face of the looped metallic band.

In the band clamping machine and the method of the present invention, both types of metallic clamping band (the looped clamping band and the disengagable clamping band), which have been wound on the member to be clamped, is automatically clamped without manual labor so that the band clamping work is automatically and efficiently executed.

Even if the inner diameter of the looped band section is changed, the clamping bands are securely clamped with fixed clamping force. Without manual operation, the band clamping work is executed safely and reliably.

BRIEF DESCRIPTION OF THE DRAWINGS

Embodiments of the present invention will now be described by way of examples and with reference to the accompanying drawings, in which.

DETAILED DESCRIPTION OF THE INVENTION

Preferred embodiments of the present invention will now be described in detail with reference to the accompanying drawings.

Figure 7:
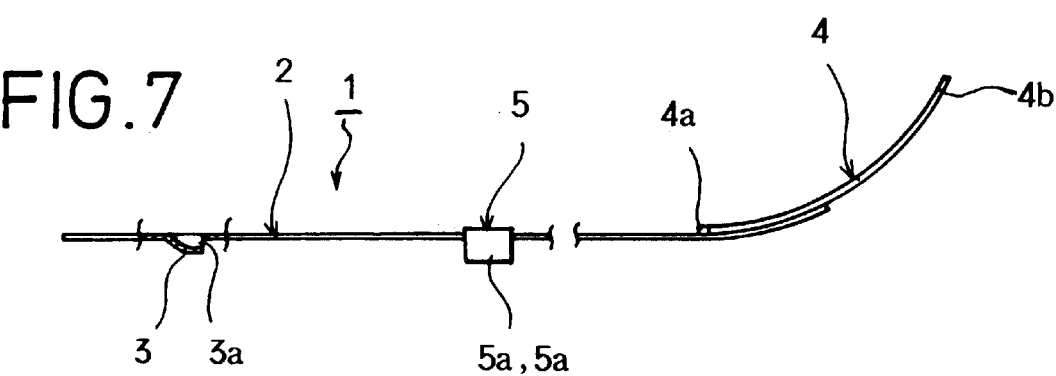
FIG. 7 is a side view of a clamping band extended.

A metallic clamping band is explained below with reference to FIG. 7. FIG. 7 is a side view of the clamping band which is extended.

In FIG. 7, the metallic clamping band 1 has a metallic band section 2. There is formed an engaging boss 3, whose one end is open at an opening section 3a, in one end section of the band section 2. The other end of the band section 2 is fixed on a mid section of a lever 4 by spot welding. One end 4a of the lever 4 is capable of engaging with the opening section 3a of the engaging boss 3. A U-shaped clasp 5 is fixed on the band section 2 by spot welding. The clasp 5 is capable of fixing the other end 4b of the lever 4 when the one end 4a of the lever 4 is engaged with the opening section 3a of the engaging boss 3 and the lever 4 is turned. The clamping band 1 is the disengagable type clamping band which has been explained in "BACKGROUND OF THE INVENTION".

Note that, the end 4a of the lever 4 is located at a position between fixing pieces 5a when the lever 4 is completely turned down.

Figure 8:
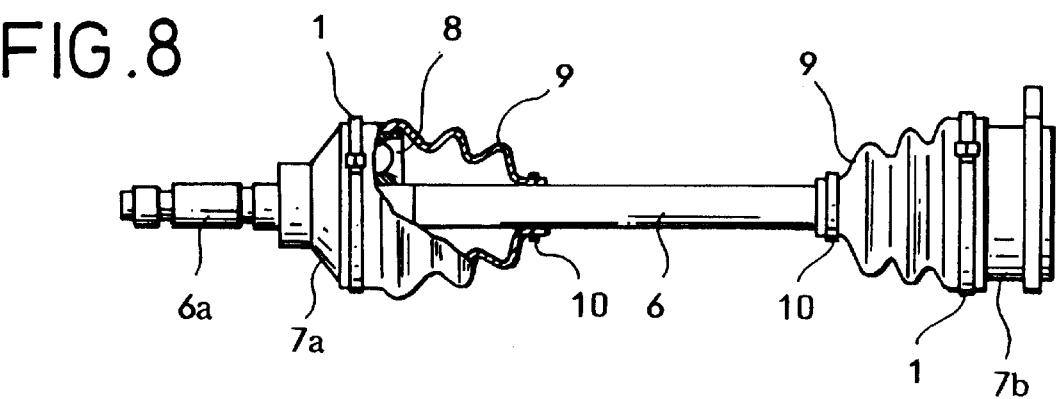
FIG. 8 is a partial sectional view of joint boots to which the clamping bands are attached.

FIG. 8 is a partial sectional view of joint boots whose ends are clamped by the clamping bands 1. External members 7a and 7b are connected with a shaft 6 by joints 8. The joints 8 are respectively covered with the joint boots 9. Lubricant of the joints 8, e.g., grease, is filled in the joint boots 9. Both ends of each boot 9 are clamped by the clamping bands 1 and 10, which have different inner diameter.

A band clamping machine of the present embodiment, which is capable of clamping the clamping bands 1 on the joint boots 9 will be explained. The clamping bands 1 are clamped by reducing inner diameter of their band sections 2.

Figure 1:
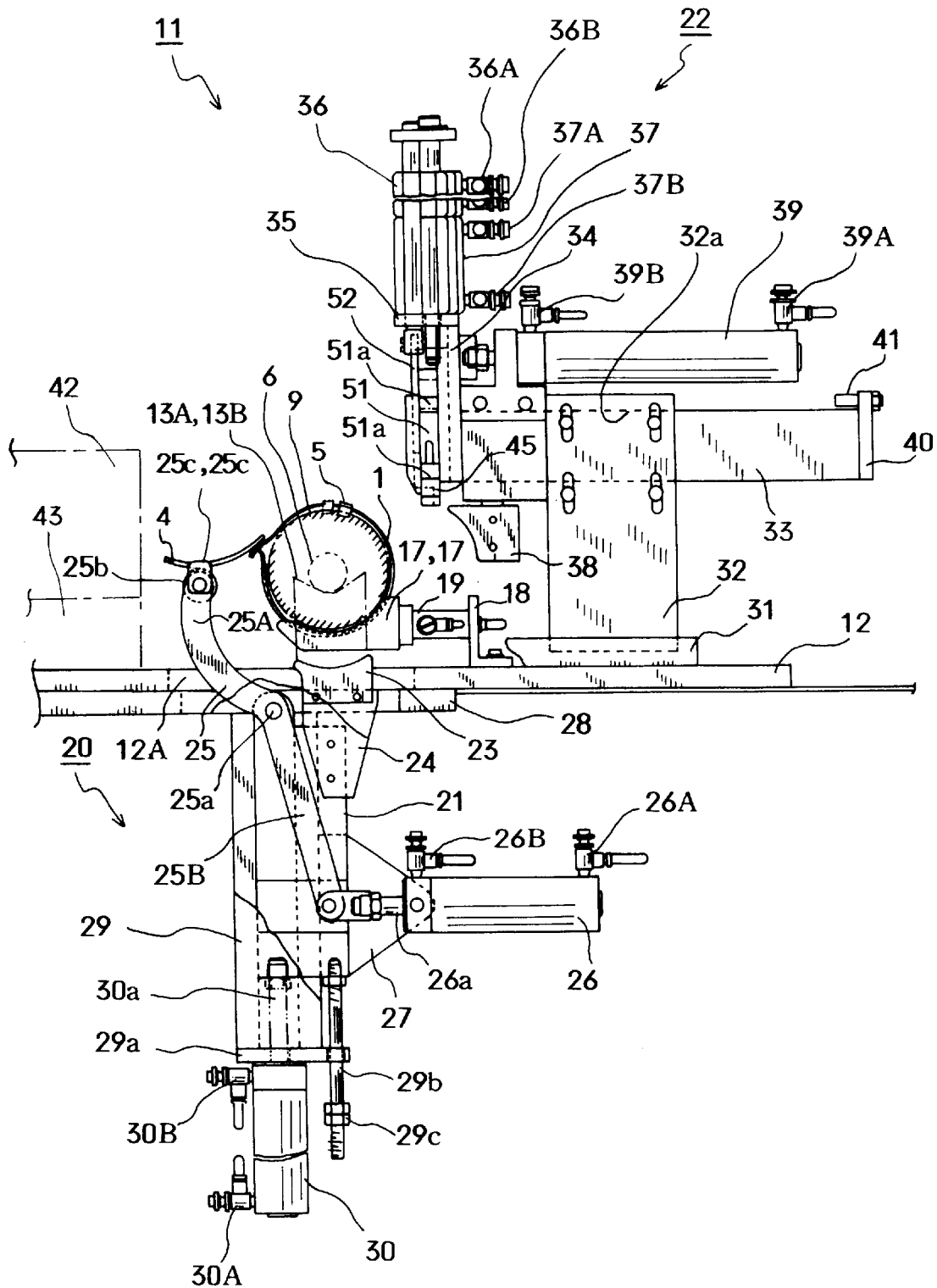
FIG. 1 is a front view of a band clamping machine of an embodiment of the present invention.

In FIG. 1, central holding members 13A and 13B are provided in a center part of a base section 12 of the clamping machine 11. The central holding members 13A and 13B are vertically projected upwardly and have V-notches in upper end sections so that a main part of the shaft 6 and an end part 6a thereof, which is extended outwardly from the external member 7a, is supported in the state that the shaft 6 is vertically arranged with respect to the drawing face of FIG. 1. The central supporting members 13A and 13B are capable of moving in an axial direction of the shaft 6. The positions of the central supporting members 13A and 13B can be changed according to size of the joint boot 9, and they are fixed at proper positions by bolts.

Figure 2A:
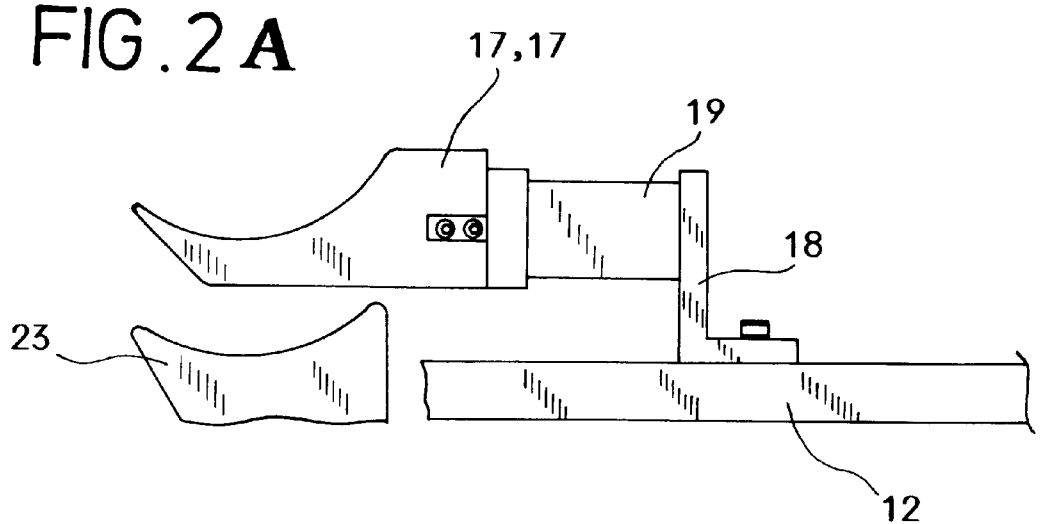
FIG. 2A is a side view of an air hand.
Figure 2B:
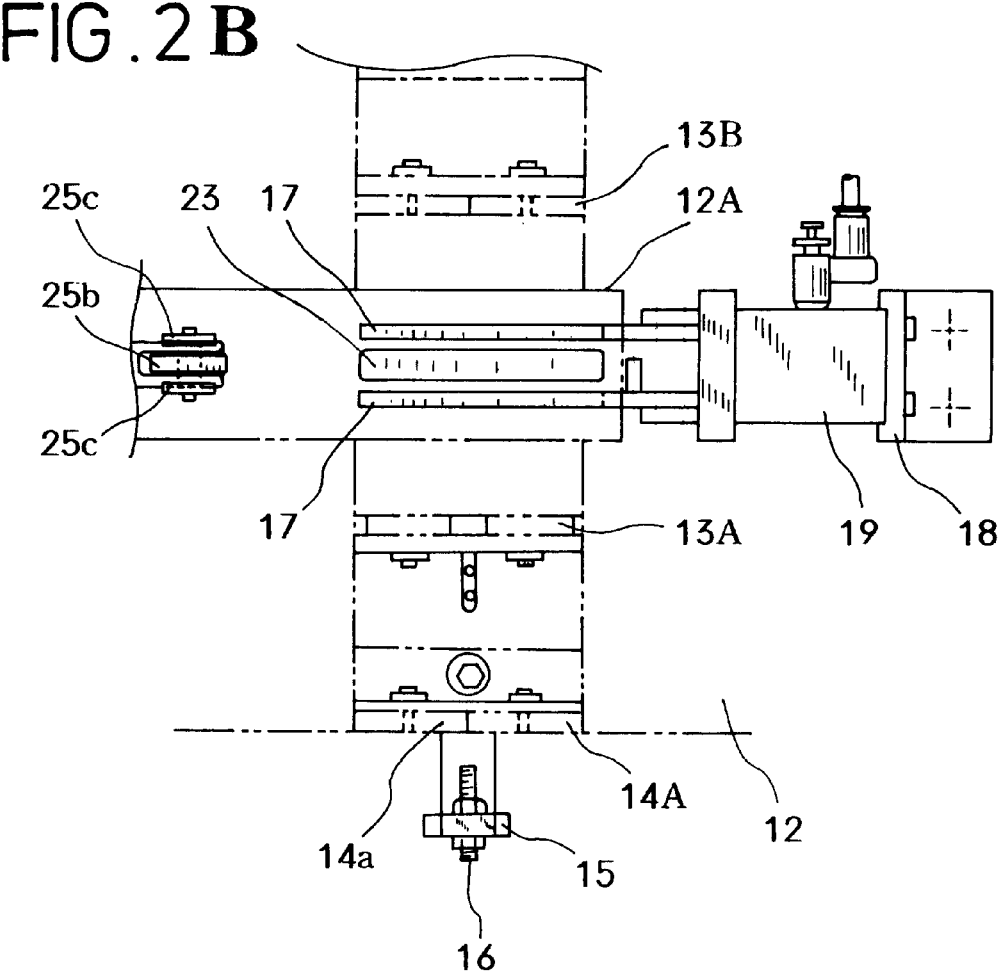
FIG. 2B is a plan view of the air hand.

As shown in FIG. 2B, end supporting members 14A and 14B (the member 14B is not shown) are provided in the vicinity of the ends of the shaft 6. The end supporting members 14A and 14B respectively have V-notches, which are capable of supporting the end part 6a and the external member 7a. The end supporting members 14A and 14B are arranged parallel to the central supporting members 13A and 13B. There is provided a stopper plate 15 on an outer side of the end supporting member 14A in parallel. A positioning bolt 16, for positioning an end of the end part 6a supported by the V-notch 14a of the end supporting member 14A, is screwed in the stopper plate 15.

The central supporting members 13A and 13B and the end supporting members 14A and 14B are capable of supporting the external member 7a, the main part and the end part 6a of the shaft 6. In the present embodiment, the clamping mechanism for clamping one of the clamping bands 1 and 10 is shown. Namely, the clamping mechanism for clamping the clamping band 1 having greater inner diameter is shown. The clamping mechanism is explained below.

In FIGS. 1 and 2B, there is formed a hole 12A in the base section 12, between the central supporting members 13A and 13B. The hole 12A is formed in the direction perpendicular to the axial direction of the shaft 6. There are a pair of support brackets 17, which are an example of holding mechanisms, above the hole 12A which are supported by an L-shaped member 18. The support brackets 17 are driven by an air cylinder 19 so that they softly pinch both sides of the clamping band 1 to hold the clamping band 1 above the hole 12A. With the support brackets 17, the clamping bands 1 are axially and circumferentially positioned. As shown in FIG. 2A, the support brackets 17 are formed into arc shapes for pinching the lower sides of the clamping member 1.

The shaft 6, whose joint 8 is covered with the joint boot 9, etc. is supported by the notches of the central supporting members 13A and 13B and the end supporting members 14A and 14B. The clamping bands 1 and 10, which have mutually different diameter, are respectively fitted on the both ends of the joint boot 9 as shown in FIG. 8. The clamping band 1 is located between the support brackets 17, and the clasp 5 is located at uppermost position. After the shaft 6 is mounted on the supporting members 13A, 13B, 14A and 14B, the air cylinder 19 is driven to pinch the lower end part of the looped clamping band 1 using the support brackets 17.

Referring to FIG. 1, there is provided beneath the hole 12A a diameter reduction mechanism 20, which turns a lever 4 of the clamping band 1 to reduce the inner diameter of the looped clamping band 1. There is provided a fixing mechanism 22 for bending fixing pieces of the clasp 5 to fix the lever 4 onto an outer circumferential face of the looped clamping band 1, above the support brackets 17 (the right part in FIG. 1).

Note that, the support brackets 17 are exchangable according to the size of the looped clamping band.

The diameter reduction mechanism 20 for turning the lever 4 is explained below.

A holding member 23 is provided in the hole 12A of the base section 12 and under the clamping band 1 which is held by the support brackets 17. The holding mechanism 23 is formed into an arc shape corresponding to the outer circumferential face of the looped clamping band 1. The holding member 23 contacts the lower end part of the clamping band 1 so as to support and position the clamping band 1 when the diameter reduction mechanism 20 is moved upward. The holding member 23 is fixed on an attaching plate 24 by a bolt; the attaching plate 24 is fixed by a bolt to a mechanism proper 21, which is an example of a moveable frame.

A clamping arm 25 is pivotably connected to the mechanism proper 21 at a position 25a. The clamping arm 25 is turned about the axis 25a, which is parallel to the axial line of the joint boot 9 on which the clamping band 1 is attached and which is located outside of the clamping band 1. The clamping arm 25 pushes an outer face of the lever 4 of the clamping band 1, which is held by the support brackets 17, and turns down the lever onto the outer circumferential face of the clamping band 1.

There is rotatably provided a press roller 25b, which contacts the lever 4 to support and bend the lever 4, at a front end of a front part 25A of the clamping arm 25. Press guides 25c, which position the end of the lever 4 in the transverse direction, are respectively provided on both sides of the press roller 25b. A front end of a base part 25B of the clamping arm 25 is pivotably connected to a front end of a cylinder rod 26a of an arm driving cylinder (air cylinder) 26, which is an example of a second mechanism. The arm driving cylinder 26 is fixed to the mechanism proper 21 by an attaching plate 27.

When cylinder rod 26a of the arm driving cylinder 26 is projected, the clamping arm 26 is turned about the axis 25a in the clockwise direction, so that the press roller 25b turns the lever 4 down onto the outer circumferential face of the clamping band 1.

The mechanism proper 21 is attached to an attaching plate 28, which is provided under the base section 12, and the mechanism proper 21 is accommodated in a frame 29 and capable of vertically moving therein. A vertical cylinder 30, which is an example of a first mechanism, is attached to a bottom plate 29a of the frame 29. A cylinder rod 30a of the vertical cylinder 30 is connected to a bottom of the mechanism proper 21. If the vertical cylinder 30 is driven, the mechanism proper 21 in the frame 29 is moved upward until the holding member 23 passes through the hole 12A of the base section 12 and contacts the lower circumferential face of the clamping band 1. Simultaneously, by the upward movement of the clamping arm 25 which is holding the lever 4, the lever 4 is first turned from a holding position (an initial position) to a mid position by the press roller 25b. There is attached an adjusting screw 29b, having an upper end connected to the mechanism proper 21 and to the bottom plate 29a so that nuts 29c contact the bottom face 20a when the vertical cylinder 30 is driven. With this structure, the stroke of the mechanism proper 21 is limited. The arm driving cylinder 26 and the vertical cylinder 30 constitute an arm driving mechanism.

Next, the fixing mechanism 22 is explained.

In FIG. 1, a supporting plate 31, which is provided on the right side of the L-shaped member 18 for supporting the support brackets 17, is fixed on the base section 12 by bolts. A vertical block 32 is provided on the supporting plate 31. The vertical block 32 has a guide groove 32a, in which a slide block 33 is slidably fitted. The slide block 33 is capable of moving horizontally (in the right-left direction in FIG. 1) in the groove 32a.

A base plate 34 is fixed to a front end (a left end in FIG. 1) of the slide block 33. A horizontal plate 35 is fixed to an upper end of the base plate 34. A press rod driving cylinder 36 and a punch driving cylinder 37 are provided on the horizontal plate 35. A positioning member 38, which is formed into an arc shape corresponding to an upper part of the clamping band 1, is attached to the lower front end (the lower left end in FIG. 1) of the slide block 33. The positioning member 38 contacts the upper-right circumferential face of the clamping band 1, which is held by the support brackets 17, to position the band 1.

A movable cylinder 39, which moves the fixing mechanism 22, is provided above the guide block 32. A cylinder rod 39a of the movable cylinder 39 is connected to the base plate 34, so that the base plate 34 is moved in the right-left direction in FIG. 1. When the movable cylinder 30 is driven, the cylinder rod 39a is extended so that the slide block 33 is moved along the guide groove 32a of the vertical block 32 together with the base plate 34 until the positioning member 38 contacts the upper-right circumferential face of the clamping band 1.

A connecting member 40 is fixed at a rear end of the slide block 33 by bolts. An upper end of the connecting member 40 is projected upward from the slide block 33, and an adjusting screw 41 is screwed in the projected end. A front end of the adjusting screw 41 is capable of contacting a right side face 32a of the vertical block 32. With this structure, forward movement of the slide block 33 is limited.

A controller 42 is fixed on the base section 12. The controller 42 controls the arm driving cylinder 26, the vertical cylinder 30, the press rod driving cylinder 36, the punch driving cylinder 37 and the movable cylinder 39. The air cylinders respectively have an air-port 26A, 30A, 36A, 37A or 39A and an air-port 26B, 30B, 36B, 37B or 39B. Compressed air is introduced to the air-ports 26A, 30A, 36A, 37A and 39A as input air-ports and the air in the cylinders are exhausted from the air-ports 26B, 30B, 36B, 37B and 39B as output air-ports so as to extend the cylinder rods; input air-ports and output air-ports interchange functions so as to retract the cylinder rods.

An operating section (not shown) having control switches for the clamping operation is provided on the base section 12. Operating commands inputted through the operating section are transmitted to the controller 42 for the clamping operation.

A compressor 43 compresses air and supplies the compressed air to the air cylinders. The compressor 43 is controlled by the controller 42 to extend and retract the cylinder rods.

Details of the fixing mechanism 22 are explained below with reference to FIGS. 3–6B.

Figure 3:
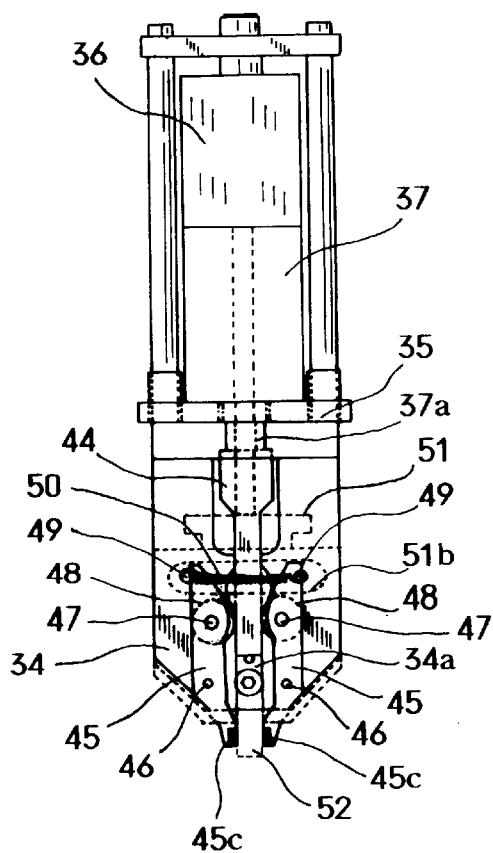
FIG. 3 is a front view of a fixing mechanism for bending fixing pieces.
Figure 5A:
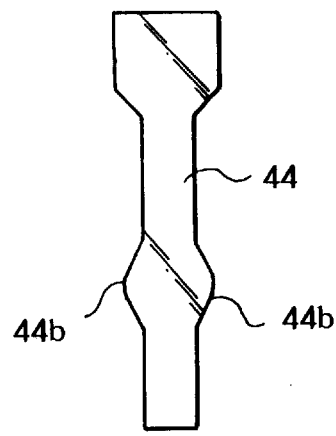
FIG. 5A is a front view of a punch.
Figure 5B:
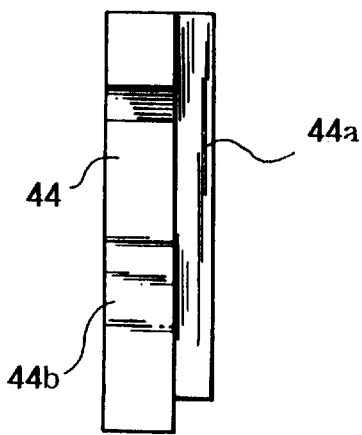
FIG. 5B is a side view of the punch.

Referring to FIG. 3, there is formed a shallow slide groove (not shown) in a front face (an upper side of the drawing face) of the base plate 34. A guide section 44a (see FIG. 5B) of the punch 44 is slidably fitted in the slide groove, so that the punch 44 is capable of vertically moving along the slide groove. The punch 44 is connected to the cylinder rod 37a of the punch driving cylinder 37.

A pair of claw members 45 are provided on both sides of the guide groove 34a, under a front lower part of the base plate 34. The claw members 45 respectively turn about axes 46. Upper inner faces of the claw members 45, which are mutually faced, are formed into slope faces 45a whose separation is gradually made narrower in a downward direction. Lower inner faces of the claw members 45a, which are under the slope faces 45a, respectively have slits 45b (see FIG. 4B). Guide rollers 48 are respectively and rotatably attached in the slits 45b at axes 47, which are parallel to the axes 46.

Pins 49 are projected from upper front faces of the claw members 45. Each end of a spring 50, which is an example of biasing means, is fixed to each pin 49, so that the upper parts of the claw members 45 are biased to mutually move together. With this structure, the guide rollers 48 contact side faces of the punch 44. There are formed expanded sections 44b (see FIG. 5A), which are expanded sidewardly, at mid positions of the punch 44.

The front faces of the claw members 45 are covered with a cover 51 (shown by dotted lines in FIG. 3). There is provided a spacer 51a (see FIG. 1) between the cover 51 and the base plate 34 to keep separation therebetween. The cover 51 has a through-hole 51b corresponding to the spring 50. And the spacer 51 has a slit 51c (see FIG. 6A) in a lower center part. An upper edge of the slit 51c is formed into a slope face 51d (see FIG. 6B).

In FIG. 3, the punch 44 is located at an initial position or the uppermost position. The guide rollers 48 of the claw members 48 contact positions on the side faces of the punch 44, which are lower than the expanded sections 44b. If the punch driving cylinder 37 moves the punch downward, lower ends of the claw members 45 are moved close to each other when the guide rollers 48 of the claw members 45 roll over the expanded sections 44b, so that the fixing pieces 5a of the clasp 5 are slightly bent inward.

Figure 4A:
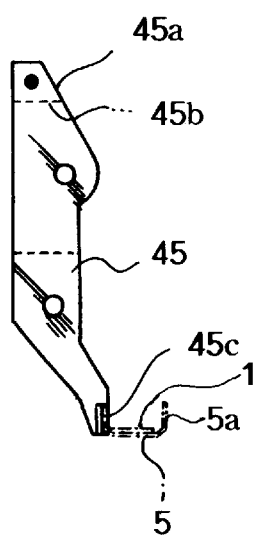
FIG. 4A is a front view of a claw member.
Figure 4B:
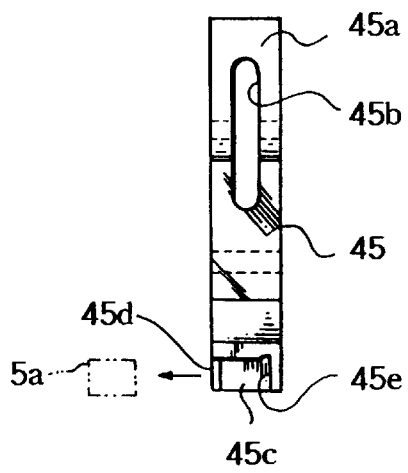
FIG. 4B is a side view of the claw member.
Figure 6A:
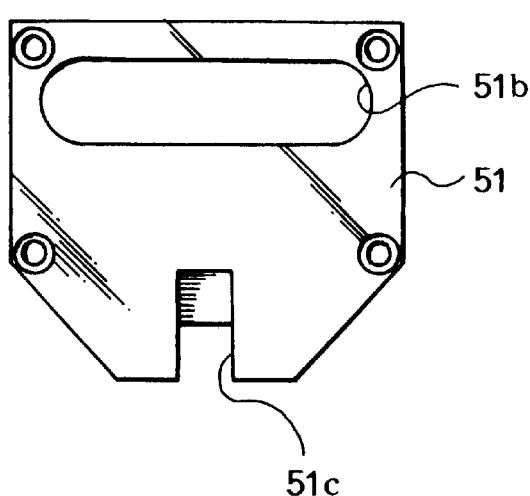
FIG. 6A is a front view of a cover member.
Figure 6B:
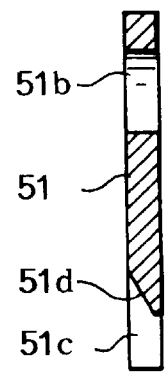
FIG. 6B is a side sectional view of the cover member.

As shown in FIGS. 4A and 4B, there are respectively formed concave sections 45c in the lower ends of the claw members 45. When the claw members 45 are moved in a tangential direction of the looped band section 2 and close to the clasp 5 of the clamping band 1, which is pinched by the support brackets 17, the clasp 5 is fitted in the concave sections 45c. Sides of the concave sections 45c, which are on the clasp 5 sides, are opened, and their edges 45d are planed off so as to smoothly introduce the fixing pieces 5a into the concave sections 45c. Rear faces of the concave sections 45c act as stopper walls 45e. When the edges of the fixing pieces 5a contact the stopper walls 45e, the looped clamping band 1 is slightly rotated in the counterclockwise direction in FIG. 1, so that the clasp 5 is located at the uppermost position.

Referring to FIGS. 1 and 3, there is provided a pressing rod 52 on the front side of the punch, which is accommodated in the cover 51. The pressing rod 52 is arranged parallel to the punch 44. The pressing rod 52 is connected to the rod driving cylinder 36. When the pressing rod 52 is located at an initial position (see FIG. 3), a lower end of the pressing rod 52 is located under the lower end of the punch 44 and in the slit 51c of the cover 51. The pressing rod 52 and the rod driving cylinder 36 constitute a lever presser.

If the movable cylinder 39 is driven, the positioning member 38 moves the fixing mechanism 22 until reaching the outer circumferential face of the looped clamping band 1, which is pinched by the supporting brackets 17. Then the clamping arm 25 of the diameter reduction mechanism 20 completely turns the lever 4 down onto the outer circumferential face of the looped clamping band 1. The rod driving cylinder 36 moves the pressing rod 52 downward to press the front end section of the lever 4. By pressing with the pressing rod 52, spring back of the lever 4 is prevented.

Successively, the action of the band clamping machine 11 is explained below.

The looped clamping bands 1 and 11 are attached on the both end sections of the joint boot 9, which covers the joint 8 of the shaft 6. The shaft 6 and the part 6a of the external member 7a are mounted in the notches of the central supporting members 13A and 13B and the end supporting members 14A and 14B, so that the clamping band 1 is located between the hands 17. The clasp 5 of the clamping band 1 is located at the uppermost position. Next, the air cylinder 19 is driven by the command inputted by the operating section so as to pinch the lower part of the clamping band 1 by the support brackets 17 (see FIG. 1).

Figure 11A:
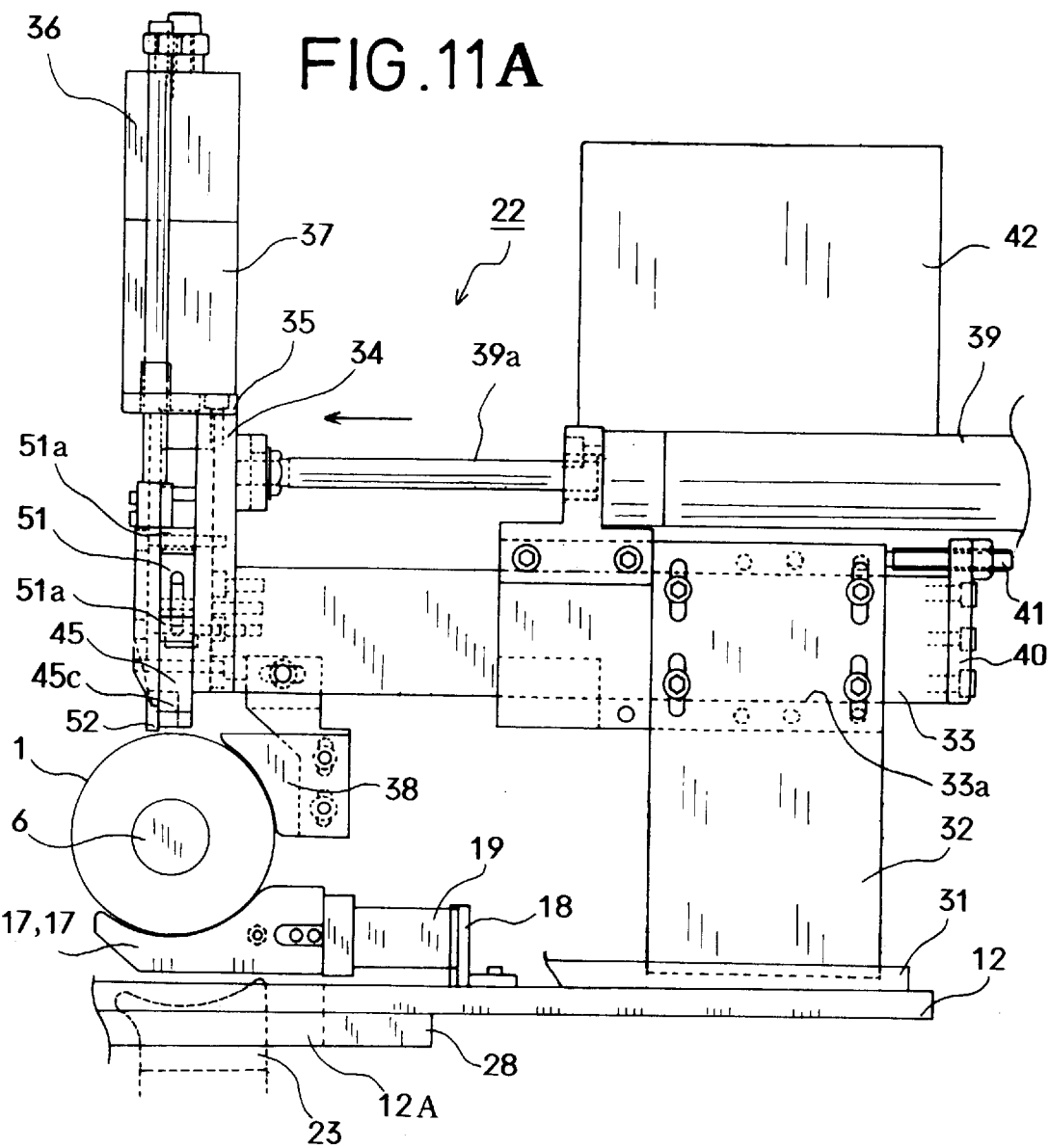
FIG. 11A is a front view showing a fixing mechanism.
Figure 11B:
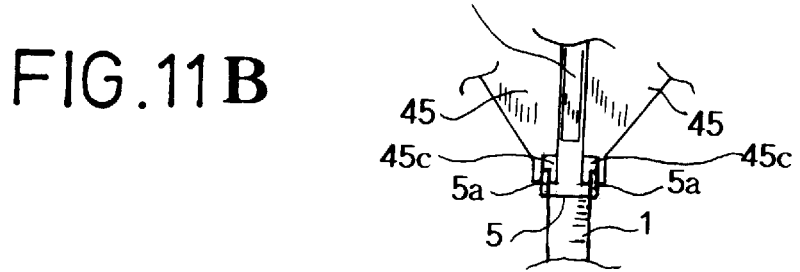
FIG. 11B is a partial enlarged view of a claw member of the fixing mechanism shown in FIG. 11A.

The movable cylinder 39 is moved, and its cylinder rod 39a is extended. Thus, the slide block 33, which is supported by the vertical block 32, is moved forward. Then, the clasp 5 enters the concave sections 45c of the claw members 45 via the opening edges 45d, and the clasp 5 contacts the stopper walls 45e of the concave sections 45c, so that the clasp 5 can be positioned therein. Note that, if the clasp 5 is shifted rightward in FIG. 1, the stopper walls 45e of the concave sections 45 rotate the clasp 5 in the counterclockwise direction by the forward movement of the slide block 33, so that the clasp 5 can be located at the uppermost position. The slide block 33 is stopped when the positioning member 38 tightly contacts the outer circumferential face of the clamping band 1. With this action, the support brackets 17 are capable of axially positioning the clamping band 1 whose clasp 5 is being located at the uppermost position; the positioning member 38 is capable of circumferentially positioning the same. The stop position of the slide block 33 is adjusted by the adjusting screw 41, which is screwed in the connecting member 40 (see FIG. 11A).

Figure 9:
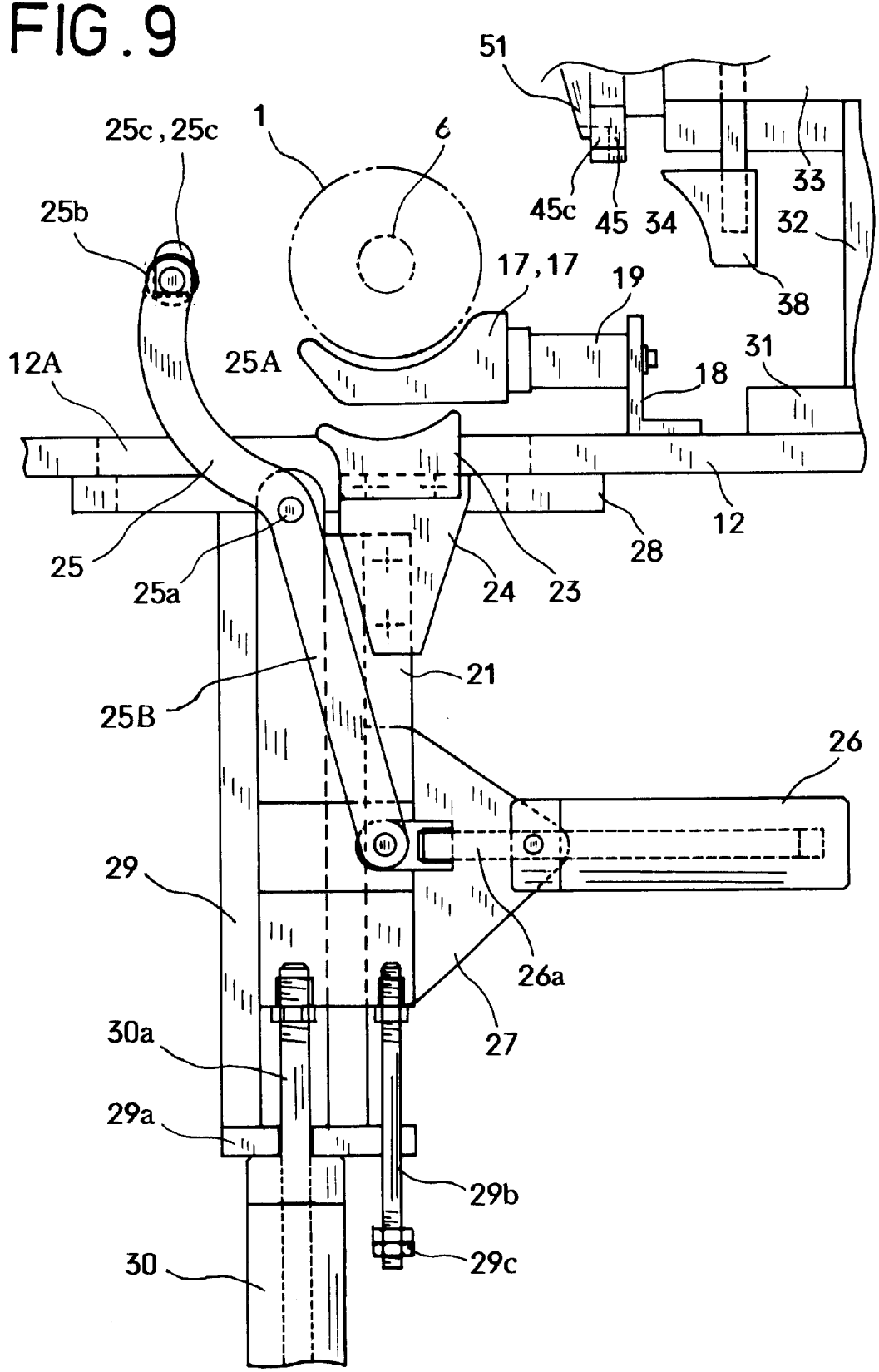
FIG. 9 is a front view of the clamping machine of FIG. 1 showing a step of diameter reduction.

The clasp 5 of the clamping band 1 is positioned in the concave sections 45c. Then the vertical cylinder 30 is driven. The cylinder rod 30a of the vertical cylinder 30 is extended, so the diameter reduction mechanism 21 is moved upward in the frame 29 until the supporting member 23 passes through the hole 12A of the base section 12 and contacts the lower circumferential face of the clamping band 1. By this action, the clamping band 1 is positioned. The lever 4 is first bent by the upward movement of the clamping arm 25. Namely, the lever 4, which is contacted by the press roller 25b, is guided by the press guides 25c, and slightly turned in the clockwise direction. The stop position of the diameter reduction mechanism 21 is adjusted by the adjusting screw 29b, which is screwed in the bottom plate 29a (see FIG. 9).

Figure 10:
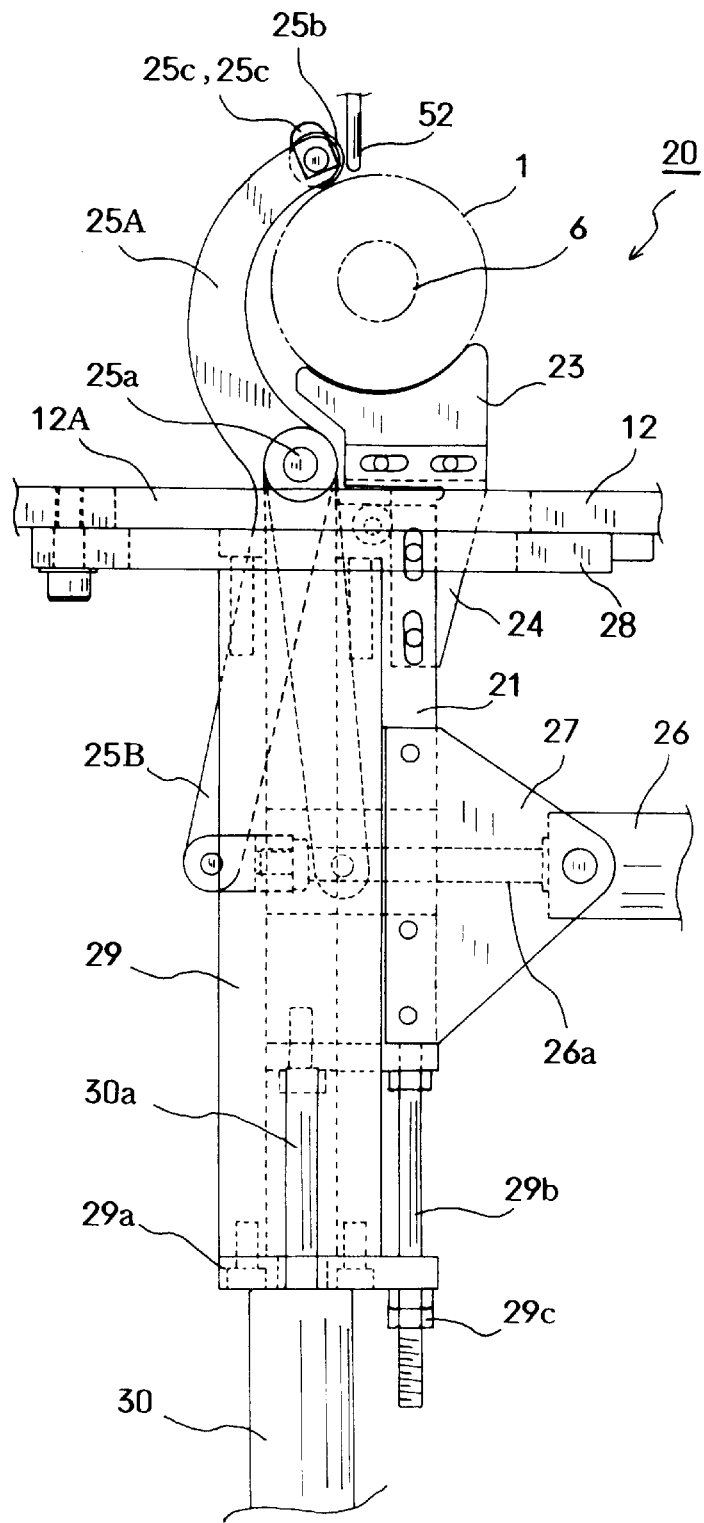
FIG. 10A is a front view showing operating states of a clamping arm of a diameter reduction mechanism.
FIG. 10B is a front view showing a clamped state of the clamping band, whose inner diameter is reduced by the diameter reduction mechanism shown in FIG. 10A.
Figure 10:
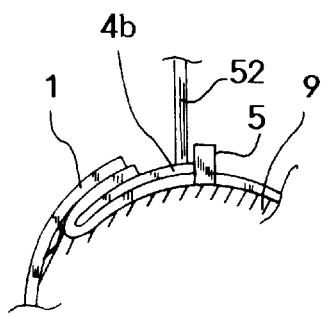

Next, the arm driving cylinder 26 is driven to extend the cylinder rod 26a, so that the clamping arm 25 is turned about the point 25a in the clockwise direction. By this action, the press roller 25b pushes the lever 4 down onto the outer circumferential face of the clamping band 1. When the diameter reduction mechanism 21 is moved upward, the lever 4 is first bent in the clockwise direction, so the lever 4 can be smoothly and completely turned by the clamping arm 25. When the lever 4 is turned, the end of the lever 4 is passed through the slit 51c of the cover 51 and into a space between the claw members 45 at a position between the fixing pieces 5a. At that time, the press roller 25b is not located between the fixing pieces 5a, which have been located at the uppermost position, and the press roller 25b presses the lever 4 at a position under the uppermost position (see FIG. 10A). Note that, since the lever 4 is positioned and supported by the press roller 25b and the press guides 25c when the shaft 6 is set, the clasp 5 of the clamping band 1 is not shifted leftward with respect to the uppermost position (see FIG. 1).

In the state that the lever 4 of the clamping band 1 is completely turned, the rod driving cylinder 36 move the press move the press rod 52 downward. By this action, the lever 4 is pressed onto the outer circumferential face of the clamping band 1. The press rod 52 presses a position on the lever 4 which is in the vicinity of the fixing pieces 5a (see FIG. 10B), so that the end of the lever 4 is prevented from rising. Namely, spring back of the lever 4 is prevented, and the lever 4 is securely fixed by bending the fixing pieces 5a.

The punch cylinder 37 is driven to move the punch 44 downward. By the downward movement of the punch 44, the lower ends of the claw members 45 are once moved close to each other when the guide rollers 48 roll over the expanded sections 44b of the punch 44. With this action, the fixing pieces 5a of the clasp 5 are slightly bent inward. By further moving the punch 44 downward, a bottom face of the punch 44 contacts upper edges of the fixing pieces 5a, so the fixing pieces 5a are further bent inward to fix the lever 4. By fixing the lever 4, the joint boot 9 is completely clamped by the clamping band 1.

After completely clamping the joint boot 9 by the clamping band 1, the punch driving cylinder 37 and the rod driving cylinder 36 are reversely driven to move the punch 44 and the press rod 52 away from the clamping band 1. The arm cylinder 26 is also reversely driven to turn the clamping arm 25 about the point 25a in the counterclockwise direction to move away from the clamping band 1.

Next, the movable cylinder 39 is reversely driven to move the slide block 33 backward (the rightward in FIG. 1) and to move the positioning member 38 away from the clamping band 1. And the vertical cylinder 30 is reversely driven to move the diameter reduction mechanism 21 downward along the frame 29, so that the holding member 23 is moved away from the clamping band 1.

The air cylinder 19 is reversely driven to release the clamping band 1 from the support brackets 17, so that the shaft 6 and the joint boot 9, whose end is clamped by the clamping band 1, can be taken out from the supporting members.

In the present embodiment, the overlapped type clamping bands, which are previously formed into loop shapes, and the disengagable type clamping bands can be employed to clamp the joint boots, etc. The members to be clamped, e.g., the joint boots, are once set on the supporting members, they can be automatically clamped by the clamping bands. Without manual operations, the clamping work can be automatically and efficiently.

Even if the inner diameter of the clamping band is changed, the clamping band can clamp the member to be stably clamped with fixed clamping force. The lever is pressed by the press rod while the fixing pieces are bent, and the fixing pieces are bent without using a hammer, so the clamping work is securely and safely executed. The members to be clamped are reliably clamped.

In the above described embodiment, the band clamping machine 11 clamps the clamping band 1, which clamps the one end of the joint boot 9 of the external member 7a. The other end of the joint boot 9 can be clamped by the clamping band 10 by the same manner.

Figure 12:
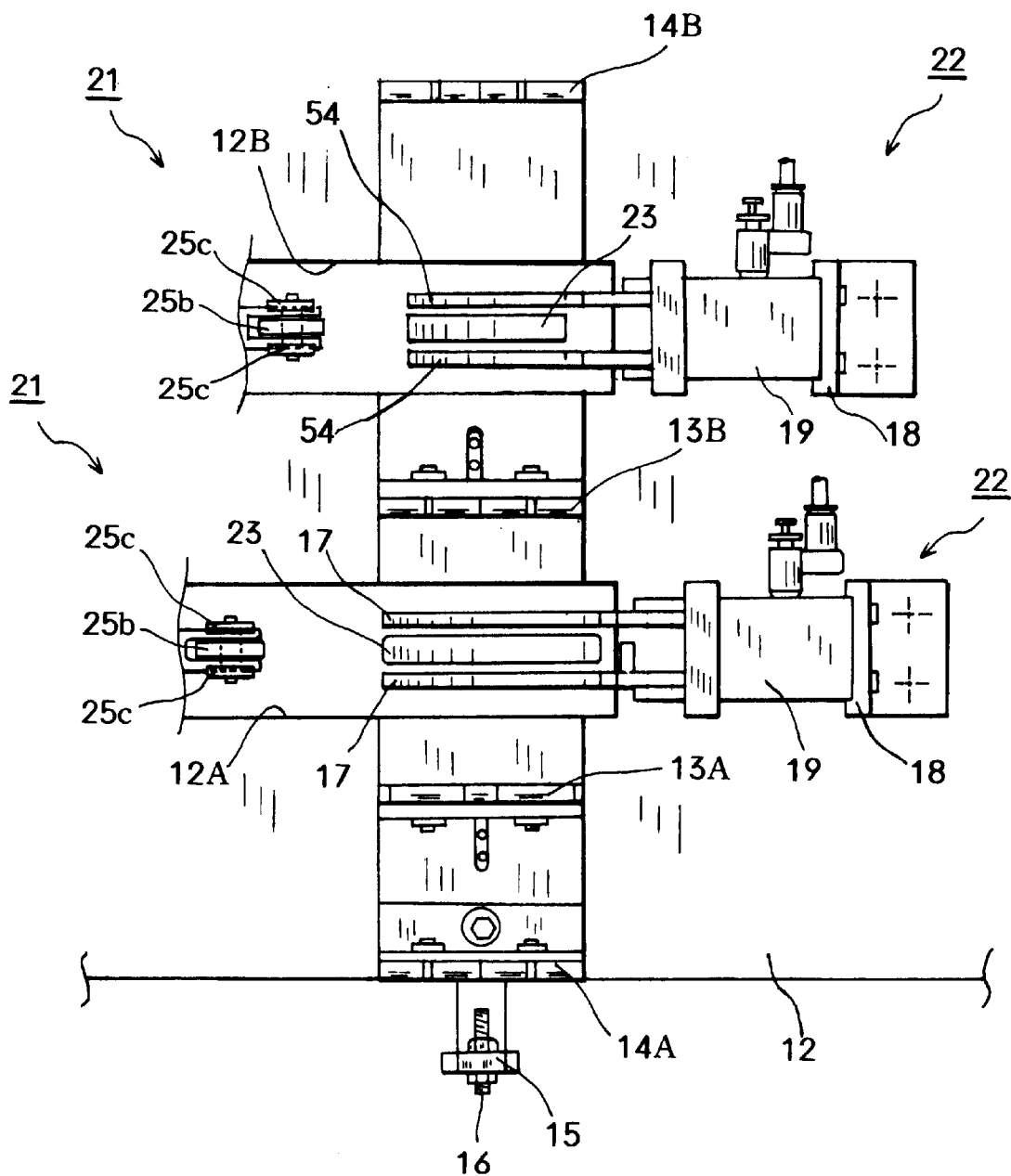
FIG. 12 is a plan view of a band clamping machine of another embodiment.

FIG. 12 shows the band clamping machine, which is capable of simultaneously clamping the both ends of the joint boot 9 of the external member 7a by the clamping bands 1 and 10 (see FIG. 8), whose inner diameter is different each other. Note that, the constituting members shown in FIGS. 1–11B are assigned the same symbols, and explanation will be omitted.

In FIG. 12, the central holding members 13A and 13B are provided in the center part of the base section 12 of the band clamping machine 11. Two pair of support brackets 17 and 54, which respectively pinch the clamping bands 1 and 10, are respectively provided above the holes 12A and 12B of the base section 12. The support brackets 17 and 54 are formed into the arc shapes corresponding to the lower sides of the joint boot 9.

The separation between the support brackets 17 and the air hands 54 is designed that the clamping band 1 is located between the support brackets 17 and the clamping band 10 is located between the support brackets 54 when the shaft 6 and the end part 6a of the external member 7a are set in the notches of the central supporting members 13A and 13B and the end supporting members 14A and 14B.

The diameter reduction mechanisms 20 are respectively provided under the support brackets 17 and 54; the fixing mechanisms 22 are respectively provided right side thereof.

When the shaft 6 with the joint 8 and the joint boot 9, to which the clamping bands 1 and 10 have been set, are set on the supporting members, the automatic clamping work is executed. Namely, the both ends of the joint boot 9 are automatically and simultaneously clamped by the clamping bands 1 and 10.

Figure 13:
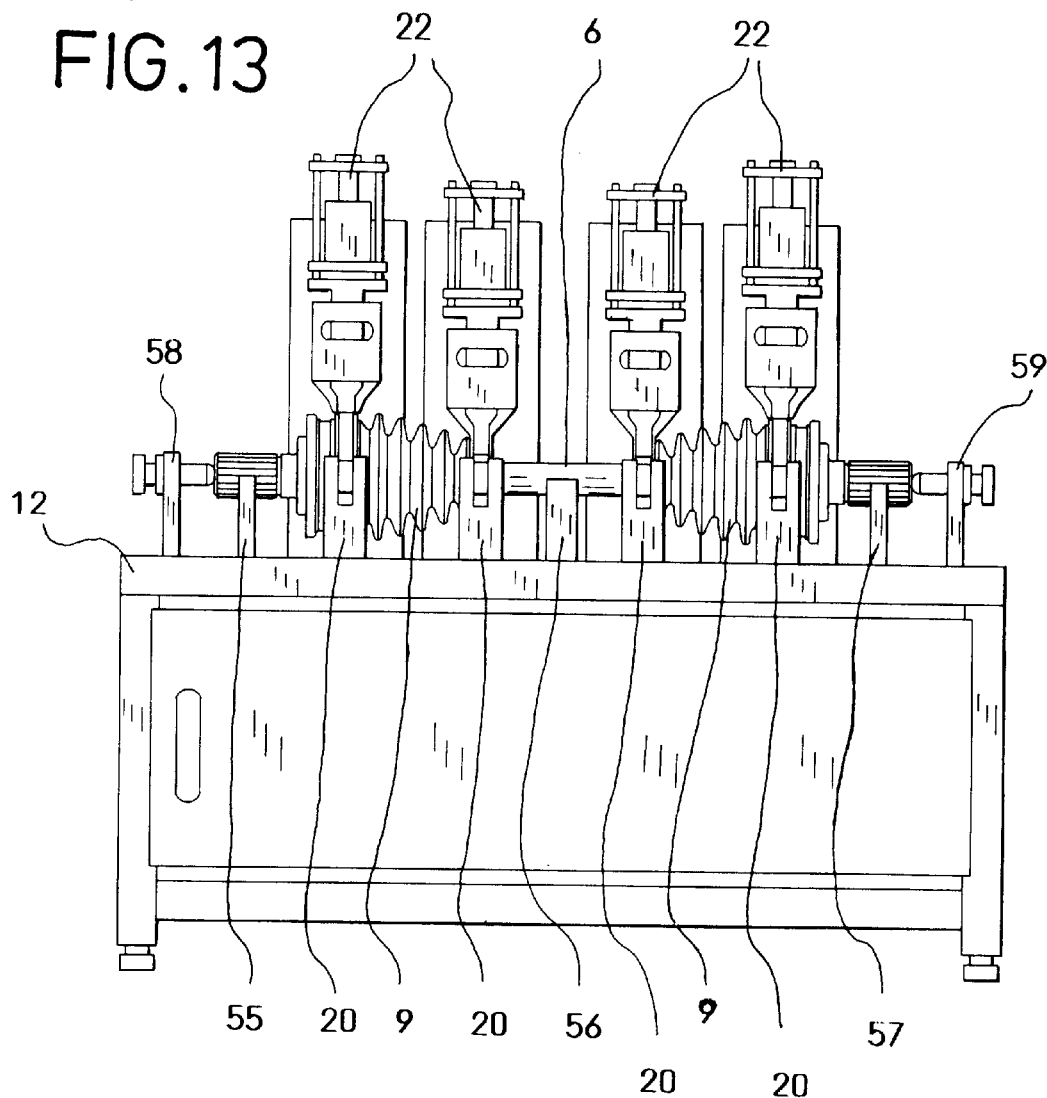
FIG. 13 is a front view of a horizontal type band clamping machine for simultaneously clamping a plurality of the clamping bands.
Figure 15:
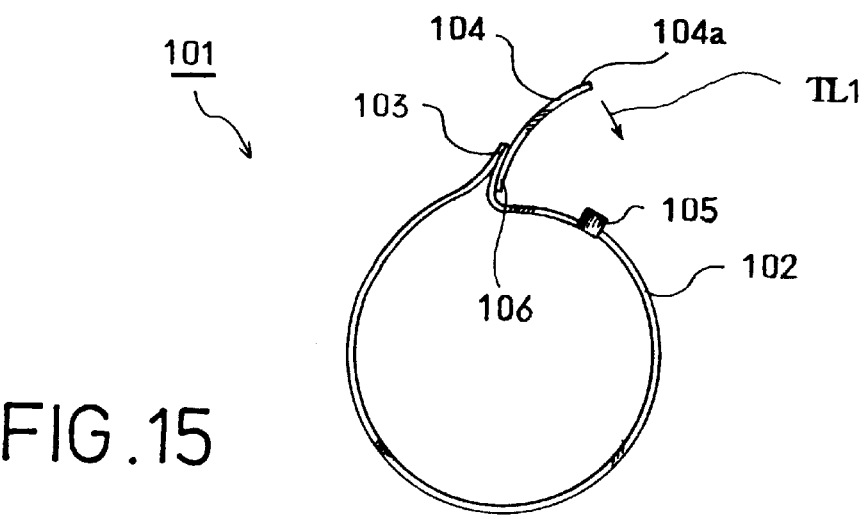
FIG. 15 is a front view of an overlapped type metallic clamping band.

In the case that the joint boots 9, which cover the joints 8 of the shaft 6, are provided to both ends of the shaft 6 (see FIG. 8), the both ends of each joint boot 9 are simultaneously clamped by the clamping bands 1, which have greater inner diameter, and the clamping bands 10, which have smaller inner diameter as shown in FIG. 13. The support brackets 17 and 54 (see FIG. 12), the diameter reduction mechanisms 20 and the fixing mechanisms 22 are provided at both sides of the shaft 6. The ends of each joint boot 9 (see FIG. 8) are simultaneously clamped by four clamping bands 1 and 10.

As shown in FIG. 13, the shaft 6, which has the joints 8 and the joint boots is horizontally mounted on the supporting members 55, 56 and 57, and the both ends of the shaft 6 is positioned by jigs 56 and 59 to clamp by the clamping bands 1 and 10.

Figure 14:
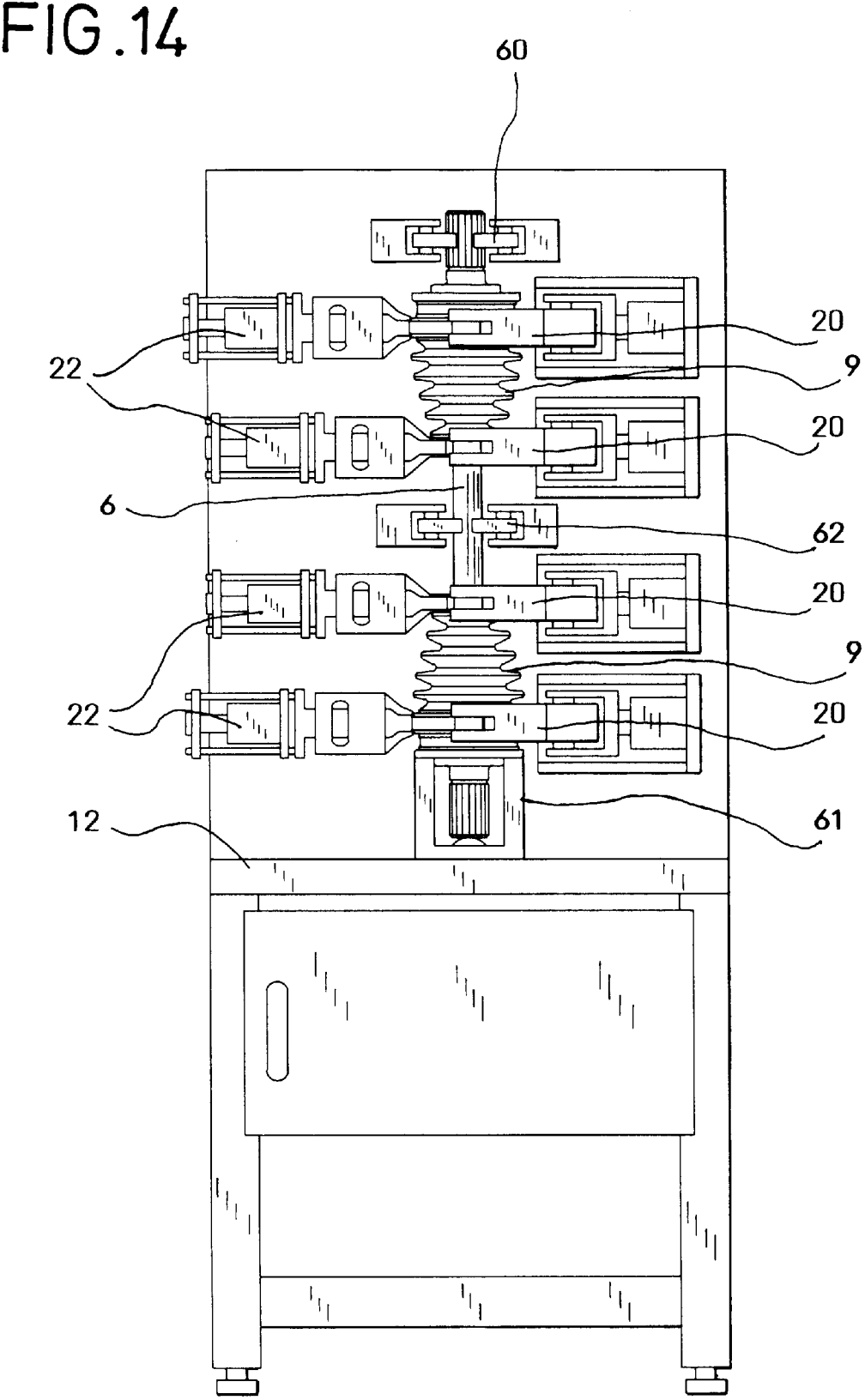
FIG. 14 is a front view of a vertical type band clamping machine, for simultaneously clamping a plurality of the clamping bands.
Figure 16:
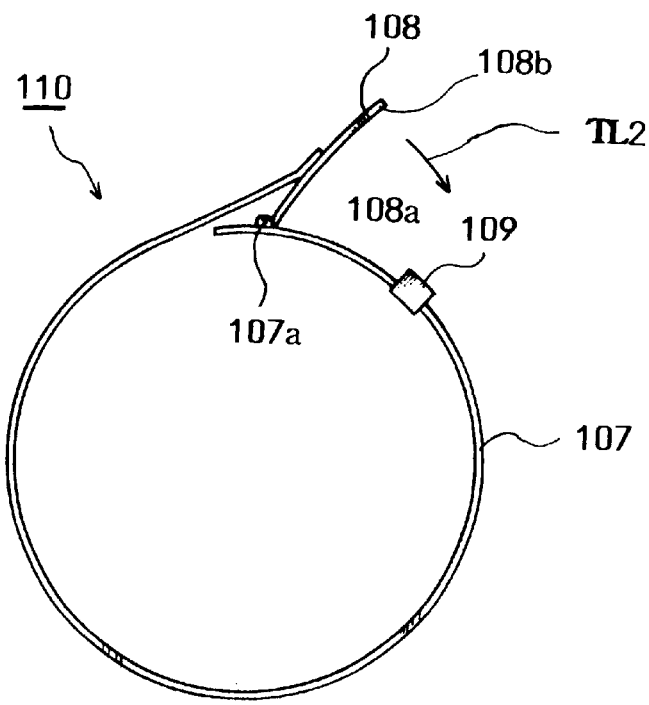
FIG. 16A is a side view of a disengagable type metallic clamping band, having a band section formed into a loop shape.
FIG. 16B is a side view of the disengagable type metallic clamping band, having a band section extended.
Figure 16:
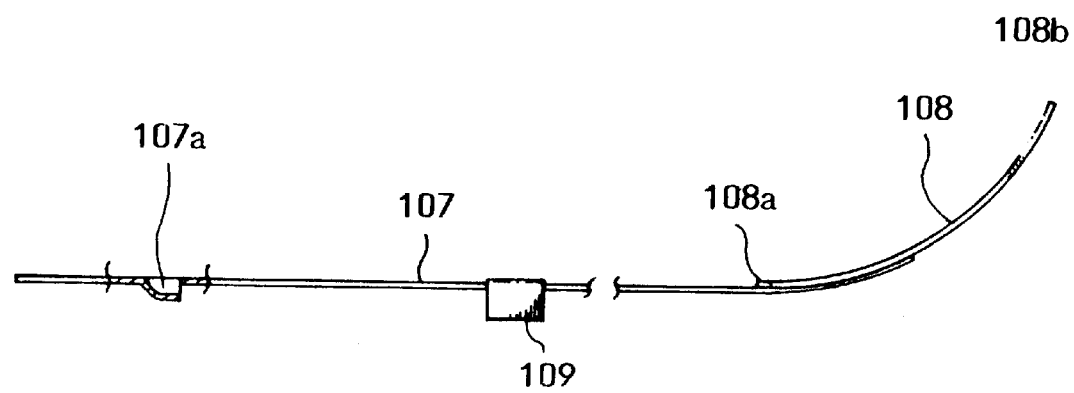

On the other hand, in FIG. 14, both ends of the shaft 6, which is vertically arranged, are fixed to and positioned by jigs 60 and 61. The mid section of the shaft 6 is fixed by a jig 62. With this structure, the shaft 6 is vertically arranged and the both joint boots 9 are simultaneously clamped by four clamping bands 1 and 10. The vertical type band clamping machine is installed in smaller area.

In the horizontal type and the vertical type band clamping machines, the arrangement of the supporting members and the number of the air hands, the diameter reduction mechanisms and the fixing mechanisms may be changed according to the size of the members to be clamped, the number of the clamping bands, etc.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A band clamping machine for clamping a band around a workpiece wherein the band has a band section formed into a looped band around the workpiece, a lever on one end of the band section for reducing an inner diameter of the looped band when the lever is turned from a first lever position extending radially from the looped band to a second lever position down on an outer circumferential face of the looped band, and a pair of fixing pieces for holding the lever on the outer circumferential face of the looped band when the lever is turned down on the looped band, each of the fixing pieces being radially extended from each longitudinal edge of the looped band, the band clamping machine comprising:

a diameter reduction mechanism having a clamping arm for engaging and turning down the lever of the metallic band so as to reduce the inner diameter of the looped band;

an arm driving mechanism for moving said clamping arm so as to turn down the lever from the first lever position to the second lever position whereat the lever is between the fixing pieces, said arm driving mechanism including:

a first mechanism for moving said clamping arm along a first locus path from an initial clamping arm position, whereat said clamping arm engages the lever at the first lever position, to a mid clamping arm position whereat the lever is turned to a mid lever position between the first lever position and the second lever position; and a second mechanism for moving said clamping arm along a second locus path from the mid clamping arm position to a final clamping arm position whereat the lever is turned to the second lever position between the fixing pieces; and a fixing mechanism for bending the fixing pieces inward so as to fix the lever at the position between the fixing pieces.

2. The band clamping machine according to claim 1, wherein:

said diameter reduction mechanism has a movable frame with a pivot mount to which said clamping arm is pivotably attached;

said first mechanism has a frame actuator for moving said movable frame from a first frame position to a second frame position to move said clamping arm respectively from the initial clamping arm position to the mid clamping arm position; and said second mechanism has a pivoting actuator for pivoting said clamping arm about said pivot mount from said mid clamping arm position to the final clamping arm position.

3. The band clamping machine according to claim 2, wherein said said movable frame has a holding member for holding the metallic band when said movable frame is at said second frame position.

4. The band clamping machine according to claim 1, wherein said fixing mechanism has a lever pressing mechanism for engaging the lever at said second lever position to keep the lever between the fixing pieces.

5. The band clamping machine according to claim 1, further comprising:

a base section having a holding mechanism for pinching sides of the looped band; and said fixing mechanism having a positioning mechanism for positioning the looped band to a prescribed position on the workpiece, said positioning mechanism moving the fixing pieces of the band section, while the looped band is pinched by said holding mechanism, to an uppermost position on the workpiece, whereby the metallic band is axially and circumferentially positioned at said prescribed position.

6. The band clamping machine according to claim 1 wherein the workpiece includes a shaft around which the band is to be clamped, and the band clamping machine include a base section having shaft holding member for is horizontally holding the shaft on said base section.

7. The band clamping machine according to claim 1 wherein the workpiece includes a shaft around which the band is to be clamped, and the band clamping machine include a base section having shaft holding member for is vertically holding the shaft on said base section.

8. A method of clamping a band around a shaft to hold a member on the shaft wherein the band is formed into a looped band which is looped around the shaft and at least a portion of the member, comprising the steps of:

holding the shaft, with member to be clamped on the shaft with the looped band looped around the shaft and a portion of the member, on a base section by pinching portions of the looped band on opposing sides of the shaft;

pushing fixing pieces of the looped band, each of which is radially extended from each longitudinal edge of the looped band, until the fixing pieces reach an uppermost position on the member to be clamped;

primarily turning a lever of the metallic band using a first actuator from a first lever position to a mid-lever position;

completely turning the lever using a second actuator from the mid-lever position to a second lever position between the fixing pieces so as to reduce inner diameter of the looped band; and inwardly bending the fixing pieces so as to fix the lever on an outer circumferential face of the looped band.

9. A band clamping machine for clamping a band around a workpiece wherein the band has a band section formed into a looped band around the workpiece, a lever on one end of the band section for reducing an inner diameter of the looped band when the lever is turned from a first lever position extending radially from the looped band to a second lever position down on an outer circumferential face of the looped band whereat holding means are provided for holding the lever at the second lever position, the band clamping machine comprising:

a diameter reduction mechanism having a clamping arm for engaging and turning down the lever of the metallic band so as to reduce the inner diameter of the looped band;

an arm driving mechanism for moving said clamping arm so as to turn down the lever from the first lever position to the second lever position said arm driving mechanism including:

a first mechanism for translationally moving said clamping arm along a first path from an initial clamping arm position, whereat said clamping arm engages the lever at the first lever position, to a mid clamping arm position whereat the lever is turned to a mid lever position between the first lever position and the second lever position; and a second mechanism for moving said clamping arm along a second locus path from the mid clamping arm position to a final clamping arm position whereat the lever is turned to the second lever position for engagement by said holding means.

10. The band clamping machine according to claim 9, wherein:

said diameter reduction mechanism has a movable frame with a pivot mount to which said clamping arm is pivotably attached;

said first mechanism has a frame actuator for moving said movable frame from a first frame position to a second frame position to move said clamping arm respectively from the initial clamping arm position to the mid clamping arm position; and said second mechanism has a pivoting actuator for pivoting said clamping arm about said pivot mount from said mid clamping arm position to the final clamping arm position along said second path which is arcuate.

11. The band clamping machine according to claim 10, wherein said diameter reduction mechanism includes a sliding mount slidably supporting said movable frame to allow movement of said clamping arm along said first path.

12. The band clamping machine according to claim 11, wherein said first path is linear.

13. The band clamping machine according to claim 9, wherein:

said diameter reduction mechanism has a movable frame with said clamping arm movably attached thereto; and said first mechanism has a frame actuator for translationally moving said movable frame from a first frame position to a second frame position to move said clamping arm respectively from the initial clamping arm position to the mid clamping arm position.

14. The band clamping machine according to claim 13, wherein said diameter reduction mechanism includes a sliding mount slidably supporting said movable frame to allow movement of said clamping arm along said first path.

15. The band clamping machine according to claim 14, wherein said first path is linear.

16. The band clamping machine according to claim 15, wherein said second path is arcuate.

17. The band clamping machine according to claim 9, wherein said holding means includes said band having a pair of fixing pieces for holding the lever on the outer circumferential face of the looped band when the lever is turned down on the looped band, each of the fixing pieces being radially extended from each longitudinal edge of the looped band, and said band clamping machine further comprises a fixing mechanism for bending the fixing pieces inward so as to fix the lever at the second lever position between the fixing pieces.

* * * * *